United States Patent [19]

Yoshikawa

[11] Patent Number: 4,797,866
[45] Date of Patent: Jan. 10, 1989

[54] OPTICAL RECORDING/REPRODUCING APPARATUS

[75] Inventor: Shoji Yoshikawa, Hachioji, Japan

[73] Assignee: Olympus Optical Co., Ltd., Tokyo, Japan

[21] Appl. No.: 16,687

[22] Filed: Feb. 19, 1987

[30] Foreign Application Priority Data

Feb. 19, 1986 [JP] Japan .............................. 61-034067

[51] Int. Cl.⁴ .............................................. G11B 7/00
[52] U.S. Cl. ......................................... 369/43; 369/44; 369/45; 369/106; 369/110
[58] Field of Search ................ 369/44, 45, 46, 43, 369/32, 33, 110, 106, 120–122; 350/601, 612; 360/32

[56] References Cited

U.S. PATENT DOCUMENTS

| | | | |
|---|---|---|---|
| 3,721,882 | 3/1973 | Helms | 318/594 |
| 4,501,493 | 2/1985 | Kubota | 369/45 |
| 4,507,766 | 3/1985 | Saimi et al. | 369/45 |
| 4,607,358 | 8/1986 | Maeda et al. | 369/44 |
| 4,669,071 | 5/1987 | Minami et al. | 369/44 |
| 4,742,505 | 5/1988 | Takeuchi et al. | 369/45 |

FOREIGN PATENT DOCUMENTS 60-182568  2/1984  Japan .

Primary Examiner—William M. Shoop, Jr.
Assistant Examiner—Brian Young
Attorney, Agent, or Firm—Armstrong, Nikaido, Marmelstein & Kubovcik

[57] ABSTRACT

A light beam for recording, reproducing, and erasing information is divided by a half mirror into a transmitted light beam directed to a recording medium and a light beam for detecting a position of a reflected movable optical pickup. Since no additional light source is necessary for detecting the position of the optical pickup the apparatus is small in size, low in cost and reduces the number of adjustments required when the optical pickup is replaced.

8 Claims, 6 Drawing Sheets

OPTICAL RECORDING/REPRODUCING APPARATUS

FIELD OF THE INVENTION AND RELATED ART STATEMENT

The present invention relates to an optical recording/reproducing apparatus in which a part of light generated from a recording/reproducing light source is utilized for detecting optical pickup positions.

Recently, information related industries have made a remarkable progress and the amount of information to be handled as a tendency to increase. Therefore, optical apparatus for recording and/or reproducing information by means of an optical pickup or in dependence upon an optical beam have been noticed with keen interest, in place of apparatus for doing the same by means of a conventional magnetic head.

In the optical recording/reproducing apparatus, a light beam from a light source (e.g. a semiconductor laser) is controlled so as to be focused through an objective lens onto a disc of recording medium. In addition, the focused light beam is controlled so as to track a target track on the disc.

Further, the apparatus is provided with tracking means so that the focused light beam is accessible to a given information recording track on a recording medium at random to record or reproduce information.

For the above tracking operation, there are provided coarse tracking means for moving an optical pickup itself with a linear motor in the track traversal direction so as to be accessible to a target track quickly when a movement distance to a target track is long, and fine tracking means for moving an objective lens in the track traversal direction within a minute range.

That is, the coarse tracking means is first actuated to quickly move a beam near a target track and then the fine tracking means is actuated to allow the beam access to the target track.

To actuate the coarse tracking means, means for detecting a position of an optical pickup is necessary. For instance, in an optical recording/reproducing apparatus disclosed in Japanese Published Unexamined Pat. Appl. No. 60-182568, a mechanism for detecting an optical pickup position is disposed under the optical pickup and within a radial movable range of a recording medium. This position detection mechanism is movable together with the optical pickup, and two light beams for this position detection mechanism are irradiated upon an opposing optical scale so as to form beam spots with a diameter half of a slit width on the optical scale. The two beams reflected from the optical scale are received by two light receiving elements to detect a radial direction to which the optical pickup is shifted on the basis of a difference in phase between the two received lights and to detect an offset distance by counting the number of light pulses reflected from the scale.

In this prior-art example, since the pickup position can be detected in digital fashion, the detection precision is very high.

Further, "Laser Applied Digital Scale" by Iwaoka, Akiyama, YOKOKAWA Tech. Lab. Report, Vol 26 No. 3 (1982) page 8 discloses a high speed high precise position detecting apparatus of digital scale type on the basis of light interference and by means of a semiconductor laser and a glass scale of diffraction grating.

Figure 1:
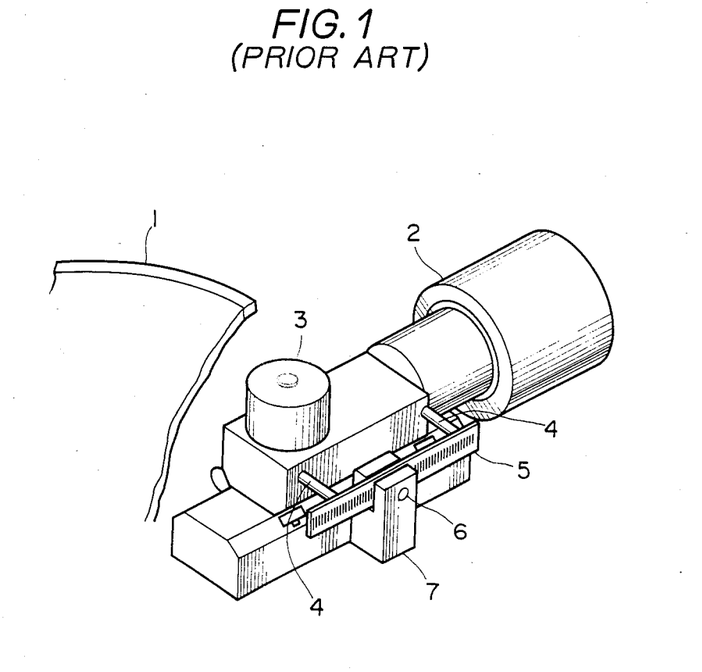
FIG. 1 is a perspective view showing a prior-art optical recording/reproducing apparatus.

Furthermore, in the prior-art recording/reproducing apparatus as shown in FIG. 1, an optical pickup 3 is moved by a voice coil motor 2 arranged so as to face a disk 1; a scale 5 is supported by two support rods 4, 4 disposed on the side surface of the optical pickup 3; a position detector 7 including an LED 6 (light source) and a light sensor arranged on both the sides of the scale 5 is moved together with the optical pickup 3; and the number of lights passed through the slits of the scale 5 movable with the pickup 3 is counted.

In the above prior-art apparatus, however, there exist some problems as follows: a light source and a light sensor should additionally be provided to read scale information; the apparatus is bulky and costly because a light source output stabilizer is further required. For instance, in FIG. 1, the apparatus is large in size because the position detector 7 is attached outside the pickup 3. In addition, the number of parts increases; the adjustment positions are many; and light source output stabilizer is necessary.

OBJECT AND SUMMARY OF THE INVENTION

The object of the present invention is to provide an optical recording/reproducing apparatus small in size, parts number, and adjustment positions, and thus low in cost.

To achieve the above-mentioned object, in the optical recording/reproducing apparatus according to the present invention, a light beam for recording, reproducing, and erasing information is splitted from a light beam directed to a recording medium by splitting means, in order to form pickup position detecting means on the basis of the splitted light beam.

BRIEF DESCRIPTION OF THE DRAWINGS

FIGS. 2 to 4 relate to a first embodiment of the present invention;

DETAILED DESCRIPTION OF PREFERRED EMBODIMENTS

Figure 2:
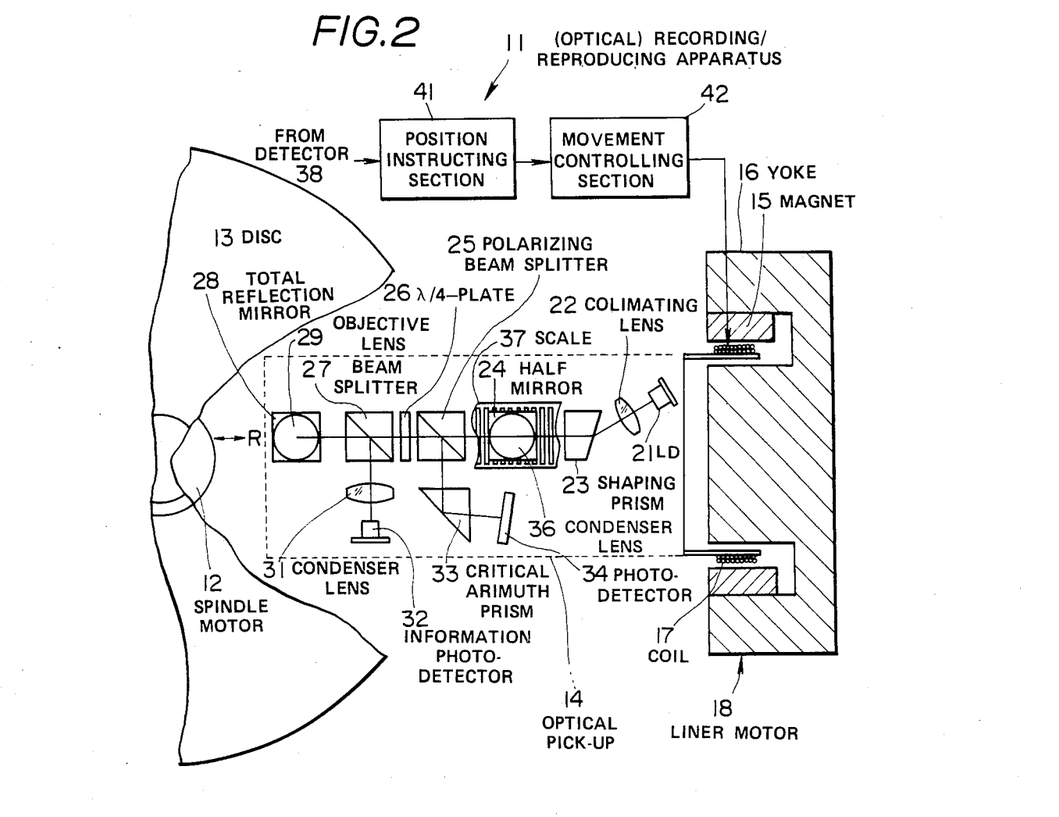
FIG. 2 is a block diagram of the first embodiment of the recording/reproducing apparatus according to the present invention.

As shown in FIG. 2, a first embodiment of the optical (information) recording/reproducing apparatus 11 is provided with an optical pickup 14 facing a disc recording medium rotated by a spindle motor 12.

This optical pickup 14 includes a linear motor 18 as coarse tracking means for driving the pickup 14. The linear motor 18 is composed of a yoke 16 of E-shaped cross section with a cylindrical magnet 15 and a moving coil 17 wound around a bobbin loosely fitted to the central portion of the yoke 16. Therefore, when current is passed through this coil 17, the pickup 14 can be moved in the radial direction R of the disc 13 (i.e. in the direction that the pickup traverses tracks on the disc 13).

Figure 3:
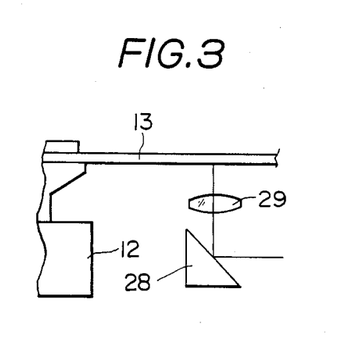
FIG. 3 is a side view showing an objective lens and its periphery in the first embodiment.

Within the housing of the pickup 14, a light source such as a laser diode 21 is housed. A p-polarized light, for instance, emitted from the laser diode 21 is converted into a parallel beam through a collimator lens 22, shaped into a circular beam through a shaping prism 23, and allowed to be incident upon a half mirror 24 so as to be divided into a transmitted beam and a reflected beam. The transmitted beam is led to a polarizing beam splitter 25, converted into a circularly polarized beam through a λ/4 plate 26, lead again to a second beam splitter 27, reflected by a total reflection mirror 28 as shown in FIG. 3, condensed by an objective lens 29, and then irradiated upon the disc 13. The intensity of light reflected from the disc 13 varies according to recorded information, that is, on the basis of the presence or absence of bits in the case of the reproducing mode. As shown in FIGS. 2 and 3, the light reflected from the disk 13 is condensed through the objective lens 29, reflected by the total reflection mirror 28, partially reflected through the second beam splitter 27, condensed by a condenser lens 31, and then received by an information (signal) photodetector 32.

The beam transmitted through the beam splitter 27 is converted into a s-polarized light through the λ/4 plate 26, reflected by the polarizing beam splitter 25, passed through a critical azimuth prism 33, and then received by a photodetector 34. Being composed of 4-divided photodetector elements, the photodetector 34 can obtain a focus error signal by critical azimuth method and a tracking error signal by push-pull method, both on the basis of a differential output sensed by a pair of photodetector elements. These two error signals are applied to an actuator coil (not shown) to move the objective lens 29 for providing focus control and tracking control.

Figure 4:
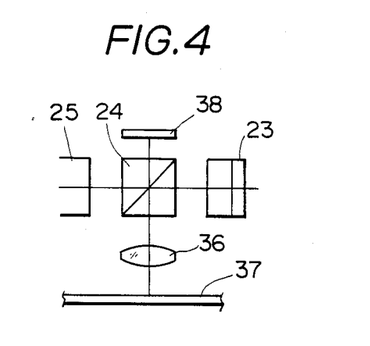
FIG. 4 is a side view showing a scale and its periphery in the first embodiment.

On the other hand, the beam reflected from the half mirror 24 is condensed by a position detection condenser lens 36 and led to an opposing scale 37. As shown in FIG. 4, the beam reflected from this scale 37 is condensed by the condenser lens 36, and a part of the beam transmitted through the half mirror 24 is received by a position detecting photodetector 38.

The scale 37 is formed with a pattern such that transmission portions and reflection portions are arranged at regular intervals in lattice form on a glass plate, for instance. Therefore, when the pickup 14 moves relative to the scale 37, the movement distance can be detected by counting a train of pulses outputted from the photodetector 38 in proportion to the movement distance of the pickup 14.

Therefore, in case an access distance between the current track position and the target track position is beyond a distance accessible only by moving the objective lens 29, a position instructing section 41 calculates a distance between the two and outputs a control signal corresponding to the access distance to a pickup movement controlling section 42, so that a current corresponding to the movement distance is passed through the coil 17 of the linear motor 18 (coarse tracking means) to coarsely adjust the pickup 14. The functions of these position instructing section 41 and the pickup movement controlling section 42 are described in detail in U.S. Pat. No. 3,721,882.

Therefore, since a beam spot moves on the scale 37 as the pickup 14 moves, the photodetector 38 detects the number of pulses corresponding to the movement distance, and the detected pulses are counted. When the number of pulses a little smaller than the above number is counted, a reverse current is passed through the coil 17 of the linear motor 18 to stop the pickup 14 immediately. After the pickup 14 has coarsely been adjusted near a target track by the coarse tracking means, the track position is read by the information detecting photodetector 32 to finely move the objective lens 29 for an accurate access to the target track.

In the first embodiment constructed as described above, since the beam from the laser diode 21 is splitted through the half mirror 24 and irradiated upon the scale 37 so as to be used as a position detecting beam, in addition to an information detecting beam and a controlling beam, it is unnecessary to newly provide a costly laser diode or LED for pickup position detection. Further, no stabilizer is required to stabilize an output of an additional position detecting light source, thus reducing the size and cost of the apparatus.

Further, since the light source is used in common, when the pickup is replaced with a new one, readjustment is unnecessary being different from the prior-art case where an independent light source for pickup position detection is positioned or adjusted.

Figure 5:
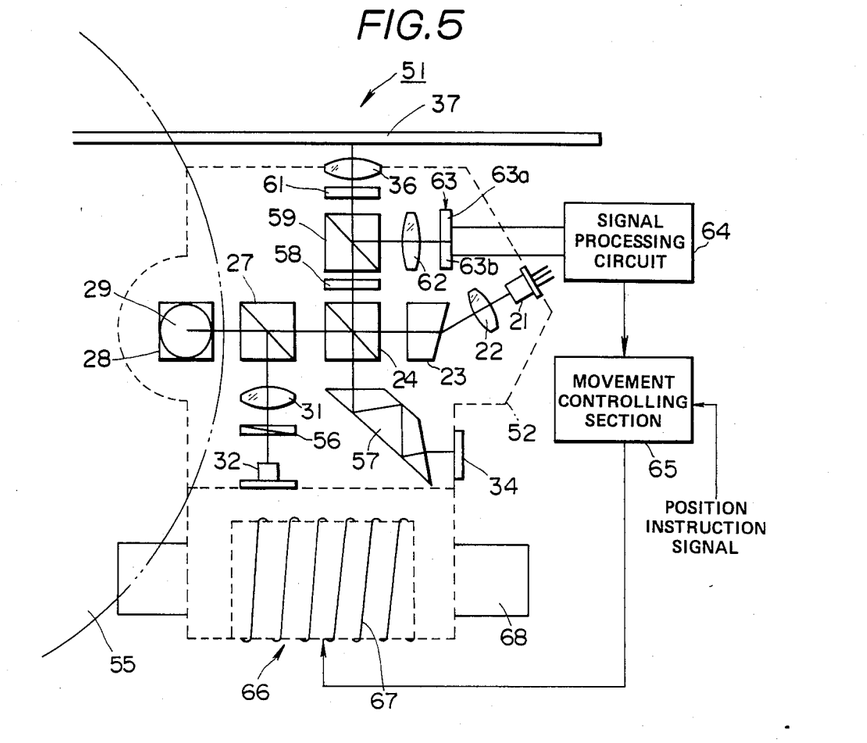
FIG. 5 is a block diagram of the second embodiment.

FIG. 5 shows a second embodiment of the present invention, in which a photomagnetic recording/reproducing apparatus 51 is illustrated.

In an optical pickup 52 of this apparatus 51, a beam from a laser diode 21 is passed through a collimator lens 22, a shaping prism 23, and a half mirror (beam splitter) 24 so as to be divided into a transmitted beam and a reflected beam. The transmitted beam from the half mirror 24 is led to a beam splitter 27, and the beam transmitted through the beam splitter 27 is reflected from a total reflection mirror 28, passed through an objective lens 29, and then irradiated upon a photomagnetic disc 55. The polarized light surface of the beam reflected from the disc 55 is rotated according to the magnetization direction of a recording film. The rotated beam is passed through an objective lens 29, a total reflection mirror 28 and a beam splitter 27, condensed by a condenser lens 31, passed through an analyzer 56, and received by an information photodetector 32 to detect a beam reflected from a recording film magnetized in a direction.

The light transmitted through the beam splitter 27 is partially reflected by the half mirror 24, multi-reflected through a trapezoidal critical azimuth prism 57, and then received by a control photodetector 34.

On the other hand, the beam reflected from the half mirror 24 is separated into a ±1-order diffracted light through a diffraction grating. These two separated beams are passed through a polarized beam splitter 59, converted into a circularly polarized light (e.g. from a p-polarized light) through a λ/4 plate 61, condensed through a condenser lens 36, and then irradiated upon a scale 37.

The beam reflected from the scale 37 is converted into a s-polarized light through the λ/4 plate 61, without being transmitted through the polarizing beam splitter 59, all reflected from the splitter 59, passed through a condenser lens 62, and then received by a position detection photodetector 63.

On the other hand, it is necessary to use a half mirror 24 to guide the reflected beam into a control photodetector 34. If this half mirror 34 is used, a part of beam from the laser diode 21 is reflected from this half mirror 24. However, this second embodiment is characterized in that the reflected beam is effectively irradiated upon the scale 37 and further the light reflected from the scale 37 is prevented from being leaked toward the half mirror 24 side (transmitted toward the control photodetector 34 side so that the S/N ratio of the focus control signal is lowered). Therefore, the position detection photodetector 63 can receive the light with a high efficiency.

The output of the position detection photodetector 63 is inputted to a signal processing circuit 64, and applied to a coil 67 of a linear motor 66 via a movement control section 65 to which a position instruction signal is also applied. Therefore, the pickup 52 is moved in the radial direction of the disc 55 together with a coil 67 loosely fitted to a magnet 68 in dependence upon current passed through the coil 67.

Figure 6:
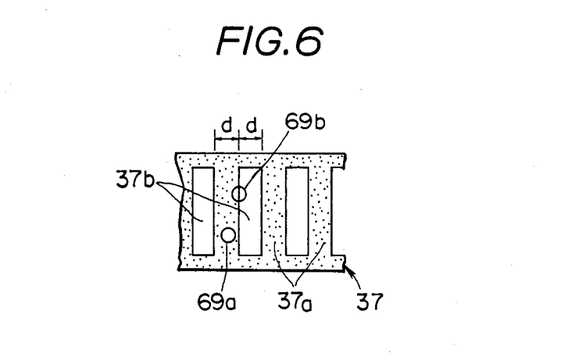
FIG. 6 is a front view showing two beam spots irradiated upon a scale.

Further, the diameter of beam spots 69a, 69b condensed and irradiated upon the scale 37 by a condenser lens 36 is so determined as to be a half of each pitch d of reflecting portions 37a and transmitting portions 37b of the scale 37, as shown in FIG. 6. The reflected beam spot is received by the photodetector 63 composed of two-divided detector elements 63a, 63b. In this case, since the diameter of both the beam spots 69a, 69b is a half of the pitch d, the pulses of the photodetector elements 63a, 63b for receiving the reflected light are offset by 90 degrees.

Figure 7:
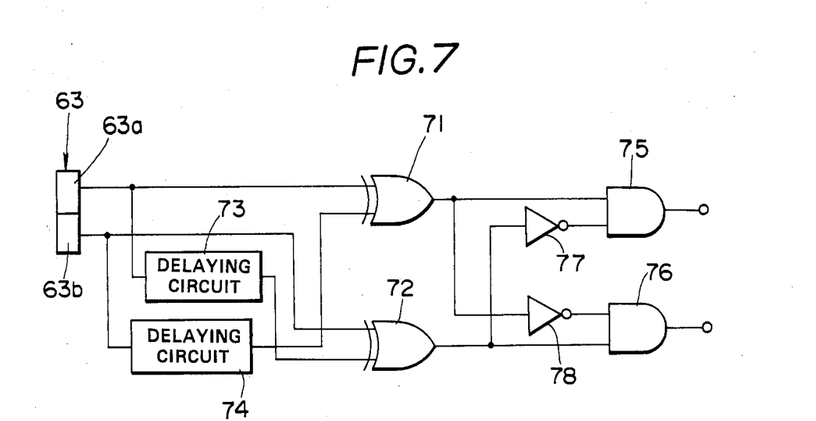
FIG. 7 is a circuit diagram showing an essential section of a position detection signal processing circuit adopted in the second embodiment.

FIG. 7 shows the signal processing circuit 64 to which outputs of the photodetector 63 are inputted. The two outputs of detector elements 63a, 63b are inputted to EX-OR gates 71, 72 and delay circuits 73, 74, respectively. A delayed signal from the delay circuit 73, 74 is inputted to the input terminal of the EX-OR gate 71, 72, respectively. The output of these EX-OR gates 71, 72 is applied to one input terminal of AND gates 75, 76 and to the other input terminal thereof via inverter 77, 78, respectively. From each output terminal of these AND gates 75, 76, a pulse corresponding to either one of the beam spots 69a, 69b reflected from the scale 37 is outputted. Therefore, it is possible to detect whether the pickup 52 is shifted toward a center of the disc or away from the center thereof in the radial direction and to detect the movement distance by counting then number of pulses. The position detecting means as described above is disclosed in detail in Japanese Published Unexamined Pat. App. No. 60-182568, the description thereof being omitted herein.

The functional effect of this second embodiment is almost the same as that of the first embodiment. As described above, however, since a beam usually not used (because this beam is partially reflected from the half mirror 24 for guiding a beam to a control system) is utilized to detect the pickup position, it is possible to detect the pickup position without reducing the intensity of light used for detecting recorded information.

Figure 8:
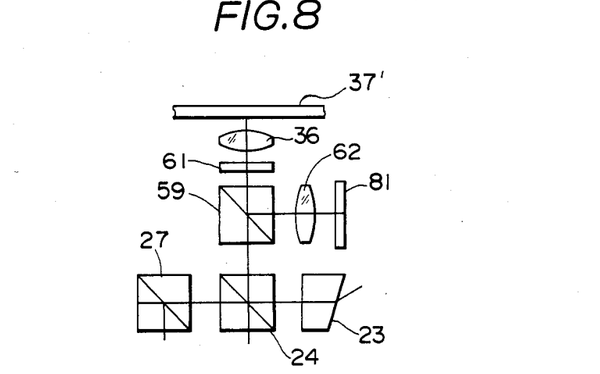
FIG. 8 is a block diagram showing a modification of the second embodiment.

FIG. 8 shows a modification of the second embodiment, in which one beam spot is irradiated upon the scale 37 without use of a diffraction grating 58. A beam applied from the laser diode 21 and reflected from the half mirror 24 is transmitted through the polarizing beam splitter 59, converted into a circularly polarized light from a p-polarized light through the λ/4 plate 61, condensed through the condenser lens 36, and then irradiated upon the scale 37'.

The scale 37' is formed with diffraction grating with a sufficiently small pitch (e.g. 20 um periodic pitch). The ±1-order diffracted light of the beam diffracted through this scale 37' is condensed through a condenser lens 62 and received by the 4-divided photodetector 81.

Figure 9:
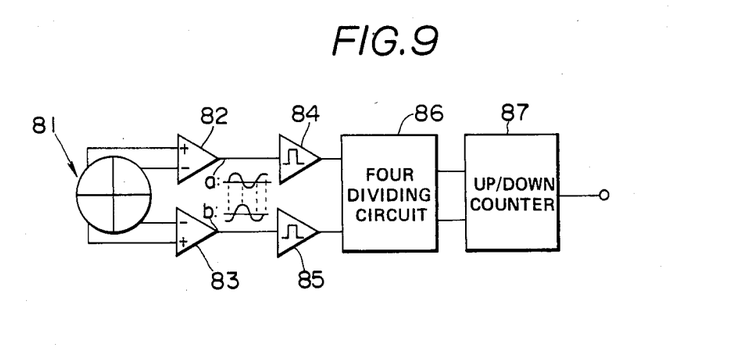
FIG. 9 is a circuit diagram showing a position detection signal processing circuit adopted in the modification.

As shown in FIG. 9, the outputs of this 4-divided photodetector 81, that is, a pair of outputs of two elements are applied to each differential amplifier 82, 83, respectively to obtain two sine wave outputs a, b having a 90 degree phase difference from each other. These signals a, b are passed through two waveform shapers 84, 85, respectively, and applied to a four-dividing circuit 84 to obtain a pulse with a ¼ periodic pitch (grating pitch). By counting the pulses by an up/down counter 87, it is possible to detect the movement distance of the pickup together with the movement direction. This position detector is explained in detail in YOKOKAWA Tech. Lab. Report already described.

Figure 10:
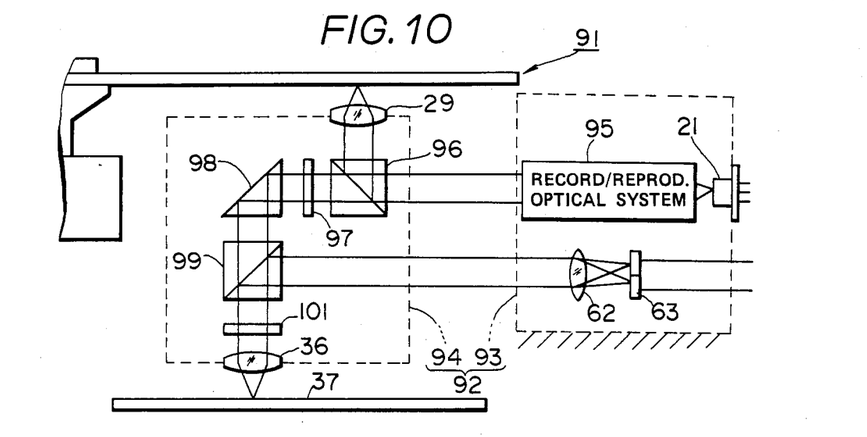
FIG. 10 is a block diagram of the third embodiment of the present invention.

FIG. 10 shows a third embodiment of the present invention, in which a separate-type pickup is shown.

That is, this pickup 92 is composed of a fixed pickup 93 and a movable pickup 94. The fixed pickup 93 sends a beam from the laser diode 21 to the movable pickup 94 via a recording/reproducing optical system 95. The movable pickup 94 separates the beam into a transmitted beam and a reflected beam through a beam splitter 96. The reflected beam is condensed by the objective lens 29 and irradiated upon the disk 3. The light reflected from the disc 3 is reflected by the beam splitter 96 and separated into an information signal and a control signal by the recording/reproducing optical system 95.

On the other hand, the beam transmitted through the beam splitter 96 is separated into ±1-order diffracted lights through a diffraction grating, reflected by a total reflection mirror 98, transmitted through a polarizing beam splitter 99, converted into a circularly polarized light from a p-polarized light through a λ/4 plate 101, condensed by the condenser lens 36, and then irradiated upon the scale 37. The beam returned from the scale 37 is converted into a s-polarized light through the condenser lens 36 and the λ/4 plate 101, reflected by the polarizing beam splitter 99, led to the fixed pickup 93, condensed by the condenser lens 62, and then received by the two-divided photodetector 63. The output of this photodetector 63 is position-detected by the signal processing circuit as shown in FIG. 7 (disclosed in Japanese Published Unexamined Pat. App. No. 60-182568).

Figure 11:
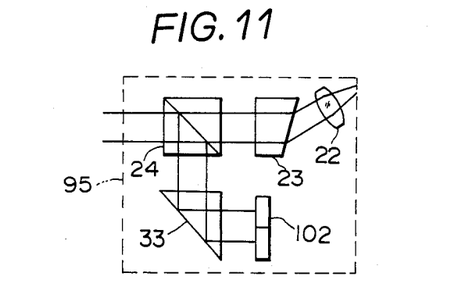
FIG. 11 is a diagram showing a recording/reproducing optical system adopted for the third embodiment.

FIG. 11 shows an example of the recording/reproducing optical system 95. In this system, a 4-divided photodetector 102 provides a focus error signal in accordance with critical azimuth method, a tracking error signal in accordance with push-pull method, and an information signal by adding both the outputs. The configuration of the optical system 95 is not limited to that shown in FIG. 11, but can be formed in combination in various forms.

Figure 12:
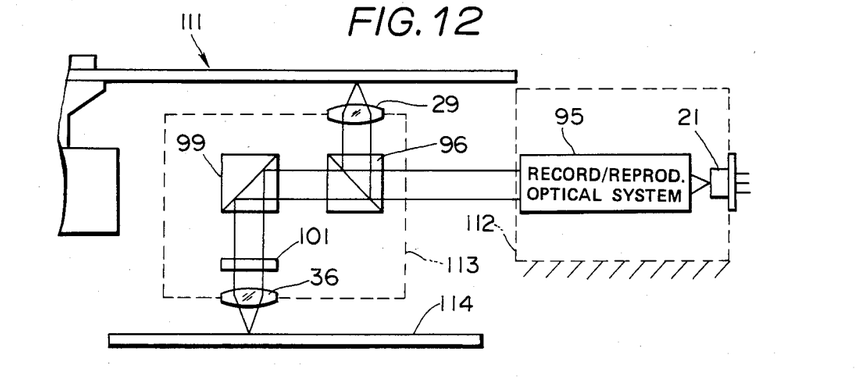
FIG. 12 is a block diagram of the fourth embodiment of the present invention.

FIG. 12 shows a fourth embodiment of the present invention, in which a semiconductor position detecting element (referred to as PSD) is adopted as position detecting means.

Similarly to the one shown in FIG. 10, in this optical recording/reproducing apparatus, a beam passed through the recording/reproducing optical system 95 of a fixed pickup 112 is led to the beam splitter 96 of a movable pickup 113. The light transmitted through the beam splitter 96 is reflected by the polarizing beam splitter 99, passed through the λ/4 plate 101, condensed by the condenser lens 36, and then irradiated upon a PSD scale 114. The beam irradiated upon the PSD scale 114 is not returned to the recording/reproducing optical system 95 via the polarizing beam splitter 99, even if reflected from the PSD scale 114.

Figure 13:
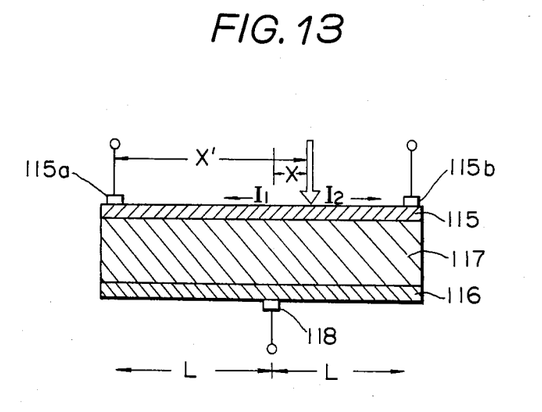
FIG. 13 is a cross-sectional view showing a semiconductor position detecting element adopted for the fourth embodiment.

FIG. 13 shows a cross-sectional view of the PSD scale 114. The PSD scale 114 is composed of a P-layer 115 formed on the surface of a flat silicon, an N-layer 116 formed on the under surface thereof, and an intermediate high-resistance insulating layer 117 of silicon substrate. Two detecting electrodes 115a, 115b are arranged on both the ends of the P-layer 115 along the scale longitudinal direction, while a bias electrode 118 is disposed at the middle of the N-layer 116. When a beam spot is allowed to be incident upon the P-layer 115, an electric charge proportional to the optical energy is generated at the corresponding position, passing through the resistive layer of the P-layer 115 as photocurrent, and outputted between the electrodes 115a, 115b. In this case, since the resistive layer is formed so as to have a uniform resistance therethroughout, the photocurrent is taken out in reverse proportion to a distance (resistance) between the beam position and the electrode 115a, 115b. For instance, when a distance between the two electrods 115a and 115b is designated as 2L; currents taken out of the electrodes 115a, 115b are designated as $I_1$, $I_2$; and the photocurrent is designated as $I_0(=I_1+I_2)$, $$I_1 = I_0(L-X)/2L$$

$$I_2 = I_0(L+X)/2L$$

or $$(I_2-I_1)/(I_1+I_2) = X/L$$

$$I_1/I_2 = (L-X)/(L+X)$$

where X denotes a distance between an origin (the middle position of the position detector element) to the beam spot irradiation position.

Further, if the origin is selected at an end of the PSD scale 114, $$I_1 = I_0(2L-X')/2L$$

$$I_2 = I_0X'/2L$$

or $$(I_2-I_1)/(I_1+I_2) = (X'-L)/L$$

$$I_1/I_2 = (2L-X')/X'$$

When X' denotes a distance between the origin (the end position) and the beam spot irradiation position.

Therefore, it is possible to obtain a beam spot irradiation position by calculating a difference between $I_1$ and $I_2$ or a ratio of both, irrespective of the intensity of the incident light.

Figure 14:
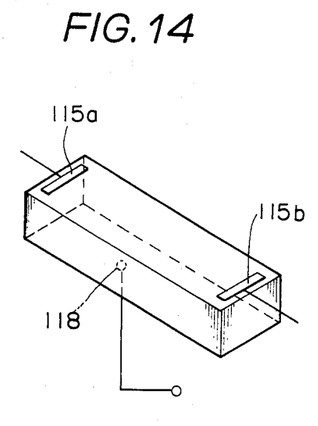
FIG. 14 is a perspective view of FIG. 13.
Figure 15:
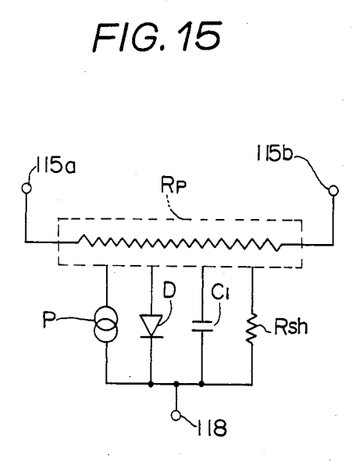
FIG. 15 is an equivalent circuit of the element shown in FIG. 13.

FIG. 14 shows the outer appearance of the PSD scale 114; and FIG. 15 shows an equivalent circuit thereof where P denotes a current source; D denotes an ideal diode; Cj denotes a junction capacitance; Psh denotes a parallel resistance; and Rp denotes a positioning resistance.

The response speed of this PSD scale 114 is determined by a time constant of a distributed constant circuit composed of a junction capacitance Cj and a positioning resistance Rp. However, the PSD scale can be applied to a laser light with a pulse width of several hundreds psec by use of a position signal integrator.

As described above, according to the present invention, since light used for at least one of information recording and reproducing operations is utilized to detect the pickup position, it is possible to reduce the number of costly parts such as laser diode, the size, and the cost of the optical recording/reproducing apparatus. In addition, it is possible to reduce the adjustment positions required when the pickup is replaced.

What is claimed is:

1. An optical recording/reproducing apparatus, comprising:
   (a) a laser source for generating a light beam for recording/reproducing operation;
   (b) an optical pickup including:
      (1) information reproducing photodetector means for receiving a light returned from a recording medium for optically recording/reproducing information to reproduce data recorded in the recording medium;
      (2) control photodetector means for receiving the light returned from the recording medium to effect position control of the light beam;
      (3) pickup position detecting means for detecting a position of said optical pickup; and
      (4) an optical system for guiding the light beam from said laser source to the recording medium, said information reproducing photodetector means, and said control photodetector means; said optical system
         including half mirror means for dividing the light beam from said laser source to a transmitted beam directed to the recording medium and a reflected beam directed to said pickup position detecting means, and for reflecting light returned from said recording medium to said control photodetector means; and
   (c) pickup moving means for moving at least a part of said optical pickup in a track traverse direction;
   whereby said pickup position detecting means will detect the position of said optical pickup in response to said reflected beam and said control photodetector means will control the position of the transmitted beam on the recording medium in response to said light returned from the recording medium.

2. The apparatus of claim 1, wherein said pickup moving means moves the whole optical pickup.

3. The apparatus of claim 1, wherein said optical pickup comprises a movable pickup section moved by said pickup moving means and a fixed pickup section arranged facing a moving direction of said movable pickup.

4. The apparatus of claim 1, wherein said optical system of said optical pickup converts a linearly polarized light beam into a circularly polarized light through a λ/4 plate, directs the converted light to the recording medium, converts a light returned from the recording medium into a polarized light perpendicular to that directed to the recording medium through a λ/4 plate, and guides the returned polarized light to said information reproducing photodetecting means.

5. The apparatus of claim 1, wherein said optical system of said optical pickup is of photomagnetic type such that when a linearly polarized light beam is irradiated upon the recording medium, a polarized light direction of the return light varies according to magnetization directions of the recording medium.

6. The apparatus of claim 1, wherein said pickup position detecting means comprises:
  (a) an external scale having light transmitting portions and light reflecting portions arranged at regular intervals;
  (b) light detecting means for detecting a light reflected by said external scale and emitting pulse signals in response thereto; and
  (c) counting means for counting the number of pulse signals emitted by said light detecting means.

7. The apparatus of claim 1, wherein said pickup position detecting means is an elongate semiconductor position detector capable of conducting a current between longitudinal spaced ends thereof for detecting a position at which a condensed spot of said reflected beam reflected by said half mirror is irradiated on the basis of a change in said current between said longitudinal ends thereof.

8. The apparatus of claim 1, wherein said pickup position detecting means comprises:
  (a) a diffraction grating for separating the reflected beam divided by said half mirror into two light beams each having a travel direction a little different from the other;
  (b) an external scale having light transmitting portions and light reflecting portions both arranged at regular intervals, the two light beams separated by said diffraction grating being irradiated thereupon;
  (c) light detecting means for emitting pulse signals in response to receiving a light beam reflected from said external scale;
  (d) counting means for counting the number of pulse signals obtained by said light detecting means to determine pickup movement distance; and
  (e) phase detecting means for detecting a phase difference between two pulse signals to determine the pickup movement direction.

* * * * *